United States Patent
Alev et al.

(10) Patent No.: US 8,838,679 B2
(45) Date of Patent: Sep. 16, 2014

(54) PROVIDING STATE SERVICE FOR ONLINE APPLICATION USERS

(75) Inventors: Umut Alev, Mercer Island, WA (US); Rafiq El Alami, Kirkland, WA (US); Nicholas Lovell, Bellevue, WA (US); Sangeetha Sangeetha, Sammamish, WA (US); John Toews, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 261 days.

(21) Appl. No.: 12/975,550

(22) Filed: Dec. 22, 2010

(65) Prior Publication Data

US 2012/0166518 A1  Jun. 28, 2012

(51) Int. Cl.
*G06F 15/16* (2006.01)
*H04L 29/08* (2006.01)

(52) U.S. Cl.
CPC ...................................... *H04L 67/02* (2013.01)
USPC ................ 709/203; 709/227; 709/228; 726/5

(58) Field of Classification Search
USPC .............................. 709/203, 227–228; 726/5
See application file for complete search history.

(56) References Cited

U.S. PATENT DOCUMENTS

| | | | | |
|---|---|---|---|---|
| 7,076,786 B2 * | 7/2006 | Burd et al. | ...................... | 719/316 |
| 2004/0003390 A1 * | 1/2004 | Canter et al. | ................... | 717/178 |
| 2005/0204047 A1 | 9/2005 | Mitchell et al. | | |
| 2007/0061467 A1 * | 3/2007 | Essey et al. | ..................... | 709/227 |
| 2007/0162582 A1 * | 7/2007 | Belali et al. | ..................... | 709/223 |
| 2007/0208862 A1 | 9/2007 | Fox et al. | | |
| 2007/0214256 A1 * | 9/2007 | Castaneda et al. | ............ | 709/224 |
| 2008/0040484 A1 * | 2/2008 | Yardley | ......................... | 709/227 |
| 2008/0168139 A1 * | 7/2008 | Junuzovic et al. | ............ | 709/205 |
| 2010/0017695 A1 | 1/2010 | Palmieri | | |
| 2010/0077153 A1 * | 3/2010 | Archambault et al. | ........ | 711/136 |
| 2010/0174774 A1 | 7/2010 | Kern et al. | | |
| 2011/0289564 A1 * | 11/2011 | Archer et al. | ..................... | 726/5 |

OTHER PUBLICATIONS

"Design and Implementation Guidelines for Web Clients", Retrieved at <<http://msdn.microsoft.com/en-us/library/ff647327.aspx >>, Nov. 2003, pp. 17.
"ASP.NET State Management Overview", Retrieved at <<http://msdn.microsoft.com/en-us/library/75x4ha6s.aspx >>, Retrieved Date: Sep. 6, 2010, pp. 4.

* cited by examiner

*Primary Examiner* — Ario Etienne
*Assistant Examiner* — Kidest Mendaye
(74) *Attorney, Agent, or Firm* — Tom Wong; Jim Ross; Micky Minhas

(57) ABSTRACT

Online application state information is automatically saved for a user interacting with the application content. Saved states are presented to the user upon the user's return to the application. Upon the user's selection of a state, the user is presented with the online application populated with state information from prior interaction.

17 Claims, 7 Drawing Sheets

PROVIDING STATE SERVICE FOR ONLINE APPLICATION USERS

BACKGROUND

Since the early days of the World Wide Web, managing state in the stateless world of Hyper Transform Text Protocol has been a challenge for web application developers. Recently, a variety of techniques for storing and retrieving state data have emerged. In modern programming languages, developers utilize these techniques to maintain and pass state across content requests.

Applications have several different ways to persist data between user requests. For selection of the correct persistence technique, a developer may need to answer programming criteria related questions such as the target audience for data consumption, the duration of the data persistence, and the size of the data set. Answering the criteria questions may help determine which method provides a suitable solution for persisting data between requests in a web application. A developer may choose to allocate application methods to provide data to all users, with unlimited duration, and any data size. In addition, the developer may also take advantage of newer methods of storing persistence data for improved access.

In conventional applications, the application data structure is typically used to handle persistence. However, use of application data structures limits a developer to mostly read only access. Connection strings are another one of the more common pieces of data stored in application variables. Modern web environments utilize application configuration files to facilitate data persistence. Configuration files are generally convenient and simpler ways to maintain persistence data.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing state service for online application users. According to some embodiments, a state service may keep track of one or more online application states for users. A server-side state application may manage online application and user identifiers in a shared location. The application may detect a user and save states for the user. The user state may be received by the state application at predetermined intervals from a client application like a browser. The client application may be enabled to display associated states for selection by the user. The state application may then restore a state based on the user selection.

These and other features and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1:
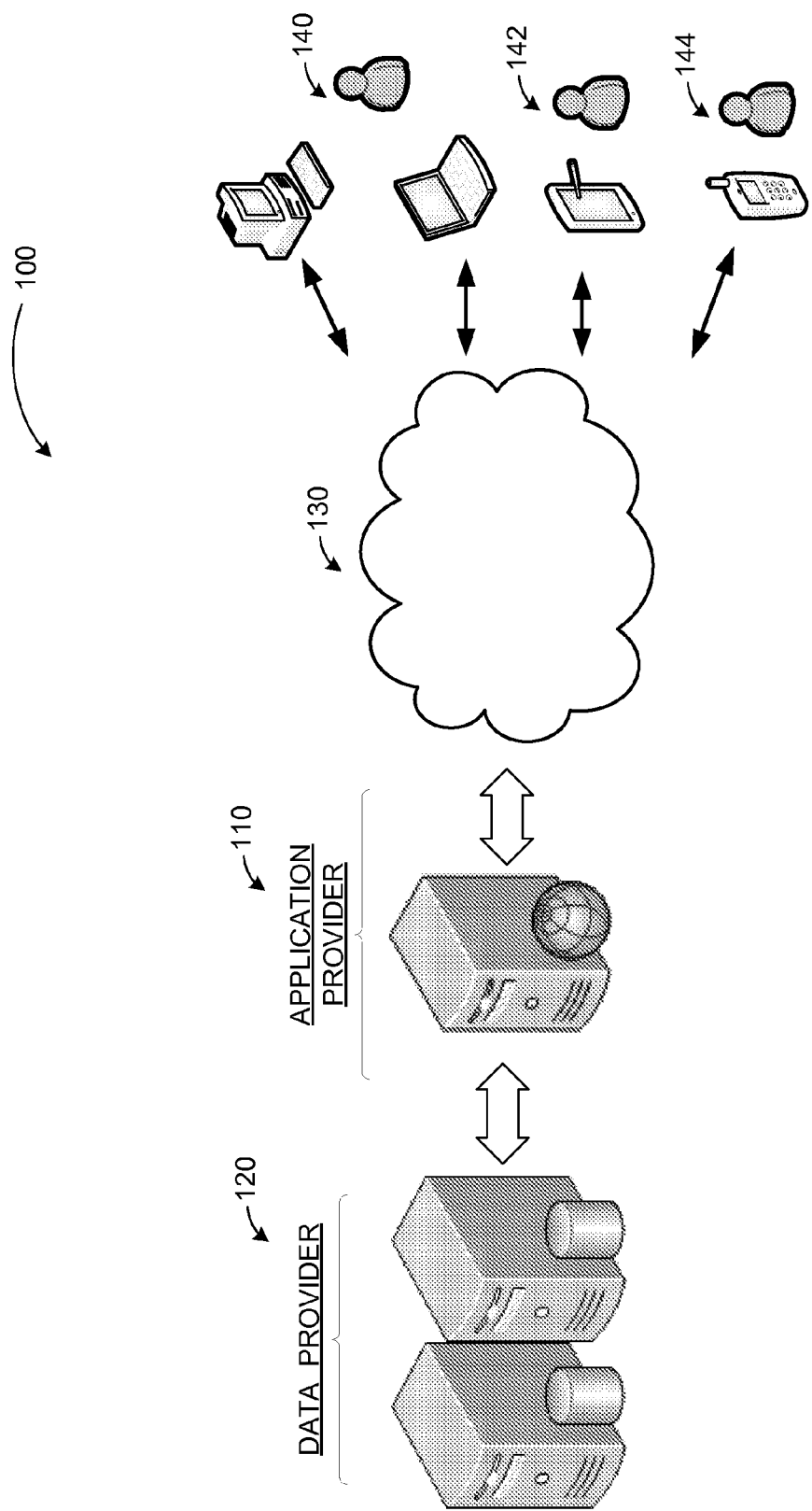
FIG. 1 is a diagram illustrating example components of a system providing state service for online application users.

As briefly described above, a state service may keep track of multiple online application states for multiple users. A server state application may manage an online application and user identifiers in a shared location. The server application may detect a user and save states for the user. A client application may send the user state to the server application at predetermined intervals. The client application may display all associated states for selection by the user. The server application may restore a state based on the user selection. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a computing device, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or a compact disk, and comparable storage media.

Throughout this specification, the term "platform" may be a combination of software and hardware components for managing web applications in a networked environment, where embodiments may be implemented. Examples of platforms include, but are not limited to, a hosted service executed over a plurality of servers, an application executed on a single server, and comparable systems. The term "server" generally refers to a computing device executing one or more software programs typically in a networked environment. However, a server may also be implemented as a virtual server (software programs) executed on one or more computing devices viewed as a server on the network. More detail on these technologies and example operations is provided below.

FIG. 1 is a diagram illustrating example components of a system providing state service for online application users. In diagram 100, the application provider 110 may execute a state service managing user state for online applications such as various web applications through network 130. The network may be an external network such as an internet based infrastructure. Alternatively, the network may be local. It may provide wired or wireless connectivity. Network nodes may connect to each other through unsecured or secured connectivity. An example of a secured connectivity may be a virtual private networking (VPN) established among the network nodes with the use of encrypted communications.

The application provider 110 may be a web server communicating through a variety of protocols. An example protocol may be the Hyper Text Transport Protocol (HTTP). The web server may also provide services to accommodate organization specific end user applications to provide content to users. An example of such services may be maintaining state for multiple users across multiple online applications. Additionally, web server may enable a user to access services through multiple client devices (e.g. client 140) or multiple users to access the same service simultaneously (e.g. clients 142, 144).

In an embodiment, the data provider 120 may be a data store. The data store may hold state information, among other things. The state information may have components to identify a user and an online application. Additionally, the state information may contain necessary information to restore the online application to a state when the user left a session with the application. An example may be restored text values that the user may have entered into a web form.

According to an example scenario, a user may be working on a web form. The user may veer away from the web form prior to completing the form. The web server may retain the user entered values in the form by saving the state of the online application. The state of the online application may be saved in the data store. The web server may present the user with the option to restore the online application state when the user returns to the web form. Upon receiving user selection, the web server may send the web form with prior entered values to the client application for presentation to the user.

Figure 2:
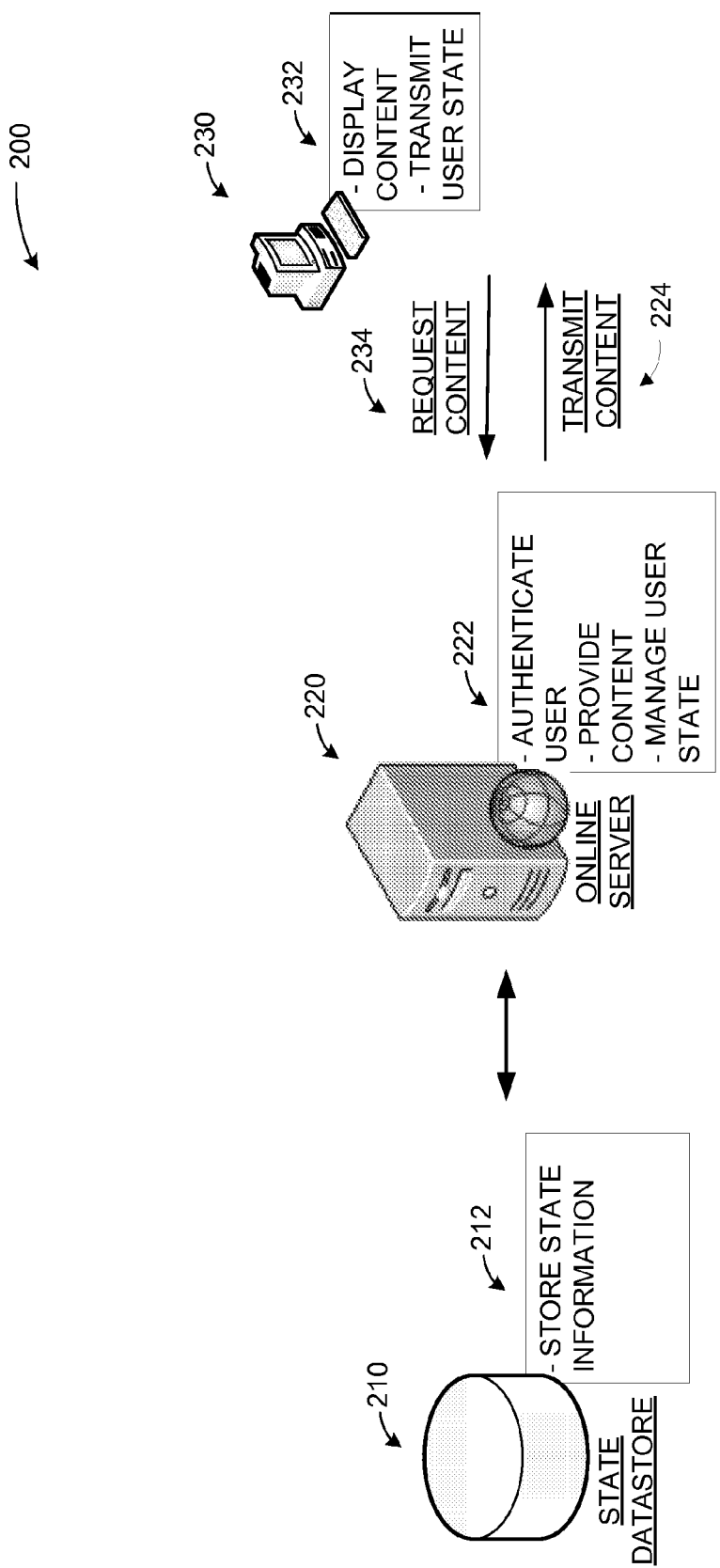
FIG. 2 illustrates example steps in managing user state while providing an online application.

FIG. 2 illustrates example steps in managing user state while providing an online application. Preserving an online application state for a user may depend on identifying the user. In some example implementations, user identification may take the form of user authentication. An example user authentication method may be user credential and password verification. An alternative identification method may be automated authentication through device recognition. User authentication methods are not provided in a limiting sense but as examples of possible authentication schemes available to systems out of many possibilities.

The web server may also be configured to handle privacy concerns due to organizational requirements. The web server may deploy an example privacy scheme where the user may be automatically de-authenticated using a predetermined schedule. Alternatively, the web server may de-authenticate the user when the user veers away from the online application. The web server may also provide options for de-authentication to the user. An example may be a check mark provided to a user to set the authentication persistence to not remain beyond system determined privacy limits.

A system according to embodiments may save user state of an online application for restoration upon user's return to the application. The online application may be a web application such as a web form or any other application providing content to users. The system may execute a state service managing states for one or more online applications and users. The state service may utilize a shared location such as a user information list to associate application and user identifiers. An online application's Uniform Resource Locator (URL) may be used to identify the application. A state key may be generated from user credentials. The state key may point to a placeholder in a data store hosting the state information. An example of state information may be extensible markup language (XML) documents containing web form values provided by the user. The data store may be a database, a file server, a data structure in the web server memory, or any other data container accessed by the web server to store the state information.

The state service may continuously manage the associated application identifier and state key. The state service may add new associations. Alternatively, the state service may remove associations when a state is no longer valid based on a variety of determinations.

The state service may rely on the web server authentication of the user to identify the user. Upon authentication, the state service may search and retrieve all state keys associated with the user from the shared location. The state service may retrieve stored state information using the state key(s) from the state data store.

A client application such as a web browser may send the user state information updates to the state service on the web server at regular intervals. Intervals may be determined based on a schedule set by the client application. Alternatively, the state service may poll the client application to determine one or more changes to the displayed online application. An example change may be additional values entered by the user into a web form.

The state service may send a list of available states to the client application. The client application may display available online application states to the user for selection. The user may choose to restore a state from the available choices. Alternatively, the user may choose not to restore the online application. If no state restoration may be chosen, the client application may display the online application with its default settings and the client application may indicate to the state service to delete the state(s) for the online application from the data store and user association(s) from the user information list.

The state service may retrieve the chosen state information from the data store once the state service may receive the selected application state to restore from the client application. Upon retrieval, the state service may transmit the state information to the client application to restore application state. An example may be a web application populating value fields of the web form with state information previously stored when the user may have previously interacted with the web form.

In diagram 200, the state data store 210 may host state information 212. The state information may include any data necessary to restore the state of an online application. An example may be values entered by a user in a web form. As previously indicated, the data store may be any data container such as a database, a file structure such as XML files, a data structure stored in memory, or any other data container. The data store may be hosted in the web server or hosted in an external data server.

Online server 220 may host a web server that may provide the state service. The state service 222 may authenticate the user, provide content such as a web form to the user, and manage the user state. Additionally, the web server may transmit content 224 to the client 230 upon receiving a content request 234 from the user. A client application may display the content 232 and transmit user state to the state service at determined intervals. Additionally, the user may interact with the client application through a device such as a desktop computer, a laptop computer, a vehicle mount computer, a handheld computer, a personal digital assistant (PDA) device, a tablet, a smartphone, and comparable devices.

Figure 3:
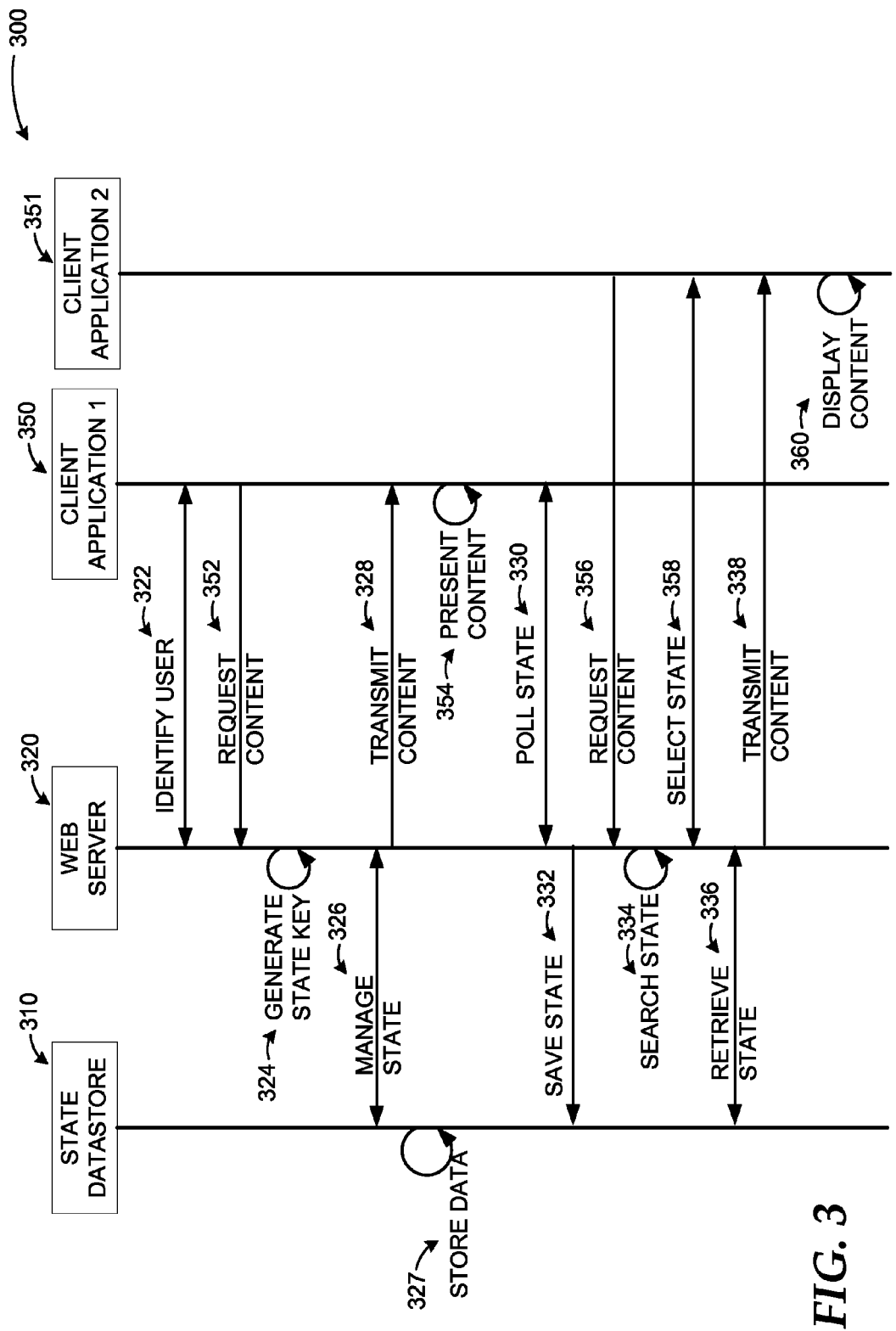
FIG. 3 illustrates an example sequence diagram according to some embodiments.

FIG. 3 illustrates an example sequence diagram according to some embodiments. As shown in diagram 300, a web server 320 may communicate with client application 350 and subsequently client application 351 while managing online application state. The application state may be stored in a state data store 310.

According to some embodiments, the web server 320 may identify the user (322), for example, by authenticating the user through the client application such as a web browser. The user may then request content (352). Upon receiving the request, the state service may generate a state key identifying where the state data may be stored in the data store. The state service may manage state (326) by associating the state key with the application identifier such as an online application URL and storing the association in the user information list (327). This data is stored separately: the user information list is separate from the state service.

Upon storing the association, the web server 320 may transmit content (328) such as a web form to the client application. The client application may display the content to the user (354). The state service may poll the client application (330) to determine changes to the state of the online application. Upon detection of state change, the state service may save changed state information (332) to the state data store.

Subsequently, the user may access the web application through another client application 351 requesting content (356), which may initiate a state search (334) by the web application to determine existing state information for the online application through the user information list. Upon locating matching user identifier and state key association(s), the state service may present the available state(s) to the user through the other client application 351 and enable the user to select the state to restore (358). Upon receiving a selection, the state service may retrieve the selected state (336) from state data store 310. The state service may transmit the state information (338) to the client application 351. And, the client application 351 may display 360 the prior state of the online application to the user.

Figure 4:
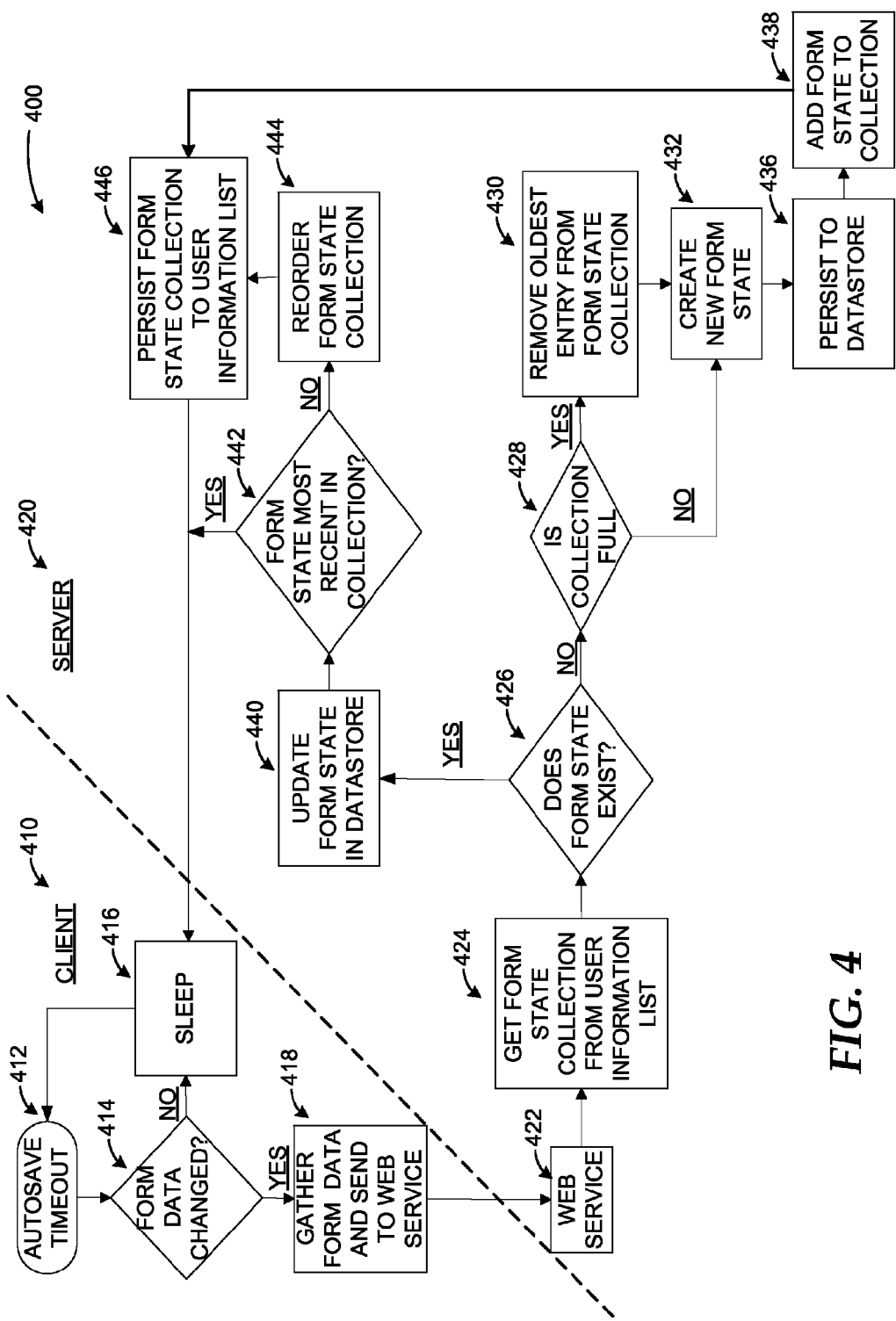
FIG. 4. illustrates an example decision diagram displaying an embodiment of user state management during online application access.

FIG. 4. illustrates an example decision diagram displaying an embodiment of user state management during online application access. In diagram 400, a client 410 may execute a client application which may determine online application state change and send changes to a server 420. The server may manage states and facilitate subsequent access to the state information.

According to some embodiments, the online application's state determination algorithm may be in a sleep cycle 416. An auto save time out algorithm 412 may awaken the state determination algorithm at a regular interval. The state change determination algorithm may determine changed form data 414. A negative determination may put the algorithm back to sleep cycle. Alternatively, a positive determination may gather form data and send gathered data to the web service 418.

The server may receive form data from a web service 422. A process 424 may get form state collection from user information list. In decision node 426, the state service may determine whether form data exists. A negative determination may lead to a determination 428 on whether the user information list is full. If yes, process 430 may remove oldest entry from form state collection. Subsequently, process 432 may create new form state and persist to data store in process 436. If the user information list is not full, new form state may be created (432) and process 436 may persist the state to the data store. And, process 438 may add form state to the data store.

If the form state does exist, process 440 may update form state in the data store. Subsequently, decision node 442 may determine whether form state is the most recent in the collection. A positive determination may return the state service back to listening mode awaiting action from the client application. A negative determination may reorder form state collection based on recentness in process 444. Subsequently, process 446 may persist form state collection to the user information list and return the state service to a listening mode waiting for action from the client application.

The systems and implementations of state service for online application users discussed above are for illustration purposes and do not constitute a limitation on embodiments. States for online application users may be managed employing other modules, processes, and configurations using the principles discussed herein.

Figure 5:
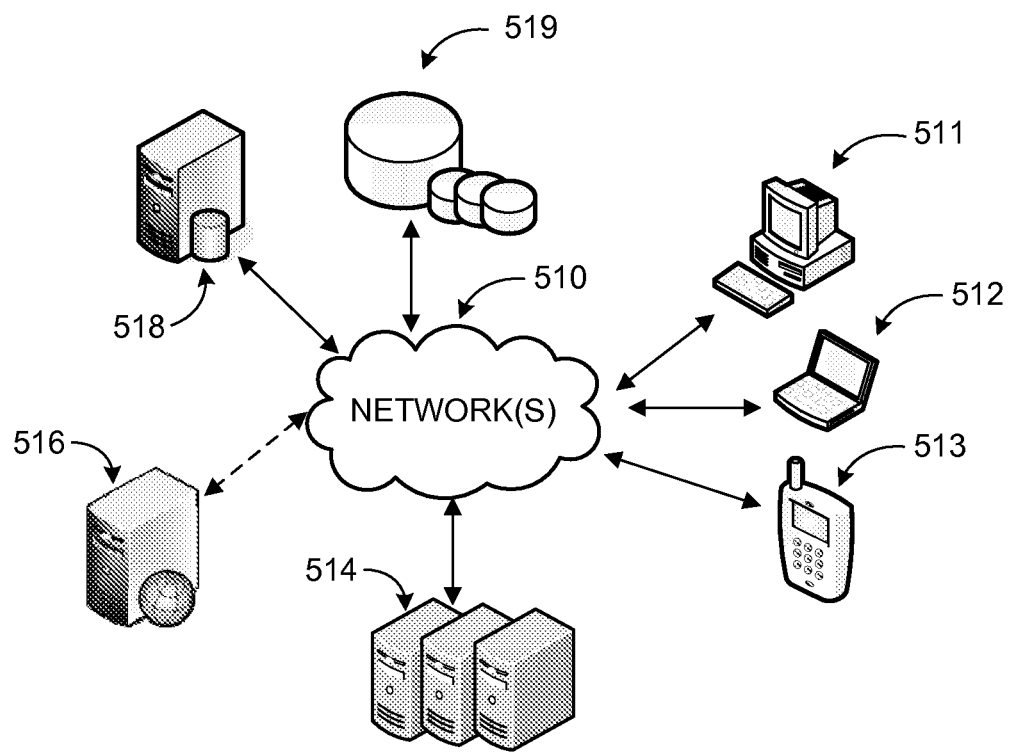
FIG. 5 is a networked environment, where a system according to embodiments may be implemented.

FIG. 5 is an example networked environment, where embodiments may be implemented. A state service algorithm may be implemented via software executed over one or more servers 514 or a single server (e.g. web server) 516 such as a hosted service. The platform may communicate with client applications on individual computing devices such as a smart phone 513, a laptop computer 512, or desktop computer 511 ('client devices') through network(s) 510.

As discussed above, a state service may execute the algorithm to manage online application user's state from a web server. A user may select which state to restore from available states. Upon user selection, the state service may transmit the state information to the client device 511-513.

Client devices 511-513 may enable access to applications executed on remote server(s) (e.g. one of servers 514) as discussed previously. The server(s) may retrieve or store relevant data from/to data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, network(s) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Many other configurations of computing devices, applications, data sources, and data distribution systems may be employed to manage state information for online applications. Furthermore, the networked environments discussed in FIG. 5 are for illustration purposes only. Embodiments are not limited to the example applications, modules, or processes.

Figure 6:
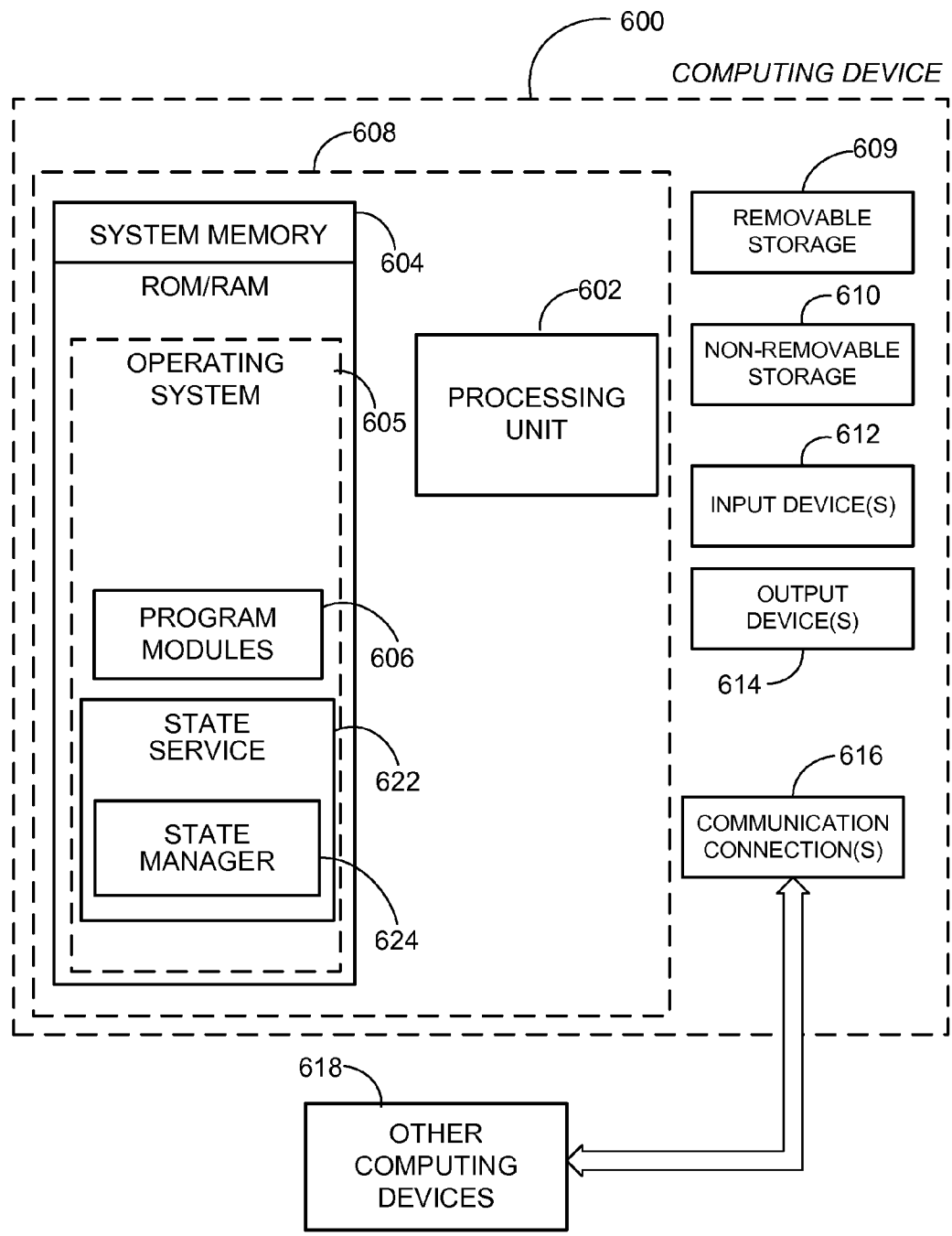
FIG. 6 is a block diagram of an example computing operating environment, where embodiments may be implemented.

FIG. 6 and the associated discussion are intended to provide a brief, general description of a suitable computing environment in which embodiments may be implemented. With reference to FIG. 6, a block diagram of an example computing operating environment for an application according to embodiments is illustrated, such as computing device 600. In a basic configuration, computing device 600 may be a server that manages state information for online application users and include at least one processing unit 602 and system memory 604. Computing device 600 may also include a plurality of processing units that cooperate in executing programs. Depending on the exact configuration and type of computing device, the system memory 604 may be volatile (such as RAM), non-volatile (such as ROM, flash memory, etc.) or some combination of the two. System memory 604 typically includes an operating system 605 suitable for controlling the operation of the platform, such as the WINDOWS® operating systems from MICROSOFT CORPORATION of Redmond, Wash. The system memory 604 may also include one or more software applications such as program modules 606, state service application 622, and state manager 624.

State service application 622 may be part of a service that provides online application state information and restores application state. State manager 624 may maintain online application state information. Available states may be presented to a user for selection and subsequent display. This basic configuration is illustrated in FIG. 6 by those components within dashed line 608.

Computing device 600 may have additional features or functionality. For example, the computing device 600 may also include additional data storage devices (removable and/or non-removable) such as, for example, magnetic disks, optical disks, or tape. Such additional storage is illustrated in FIG. 6 by removable storage 609 and non-removable storage 610. Computer readable storage media may include volatile and nonvolatile, removable and non-removable media implemented in any method or technology for storage of information, such as computer readable instructions, data structures, program modules, or other data. System memory 604, removable storage 609 and non-removable storage 610 are all examples of computer readable storage media. Computer readable storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 600. Any such computer readable storage media may be part of computing device 600. Computing device 600 may also have input device(s) 612 such as keyboard, mouse, pen, voice input device, touch input device, and comparable input devices. Output device(s) 614 such as a display, speakers, printer, and other types of output devices may also be included. These devices are well known in the art and need not be discussed at length here.

Computing device 600 may also contain communication connections 616 that allow the device to communicate with other devices 618, such as over a wireless network in a distributed computing environment, a satellite link, a cellular link, and comparable mechanisms. Other devices 618 may include computer device(s) that execute communication applications, storage servers, and comparable devices. Communication connection(s) 616 is one example of communication media. Communication media can include therein computer readable instructions, data structures, program modules, and includes any information delivery media. By way of example, and not limitation, communication media includes wired media such as a wired network or direct-wired connection, and wireless media such as acoustic, RF, infrared and other wireless media.

Example embodiments also include methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be co-located with each other, but each can be only with a machine that performs a portion of the program.

Figure 7:
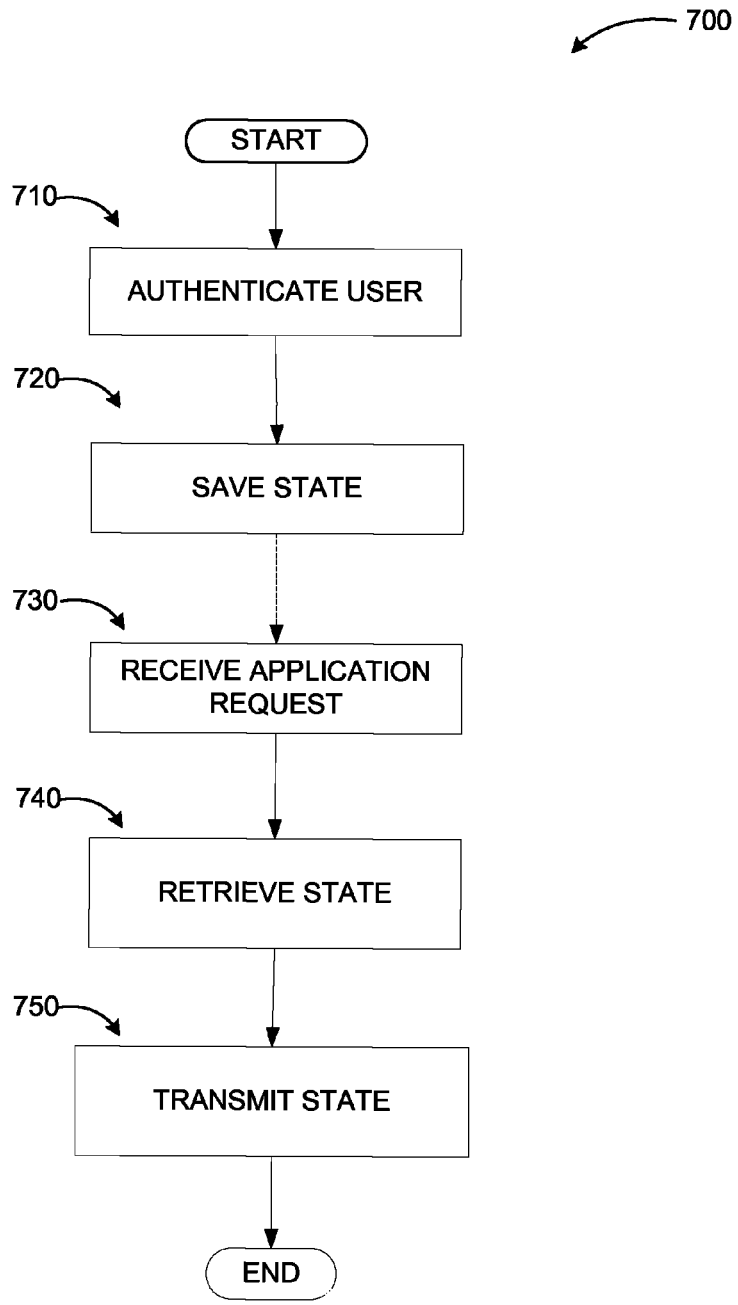
FIG. 7 illustrates a logic flow diagram for a process of providing state service for online application users according to embodiments.

FIG. 7 illustrates a logic flow diagram for a process of providing state service for online application users according to embodiments. Process 700 may be implemented by a server in an online application environment providing services to clients.

Process 700 begins with operation 710, where the web server may authenticate the user. Authentication may provide a user identifier which may be used in generating a state key for the online application. According to other embodiments, an alternative identification scheme may also be used.

At operation 720, the state service on the web server may save the state of the online application. The client application may initiate the state save by sending state information to the state service. In a typical scenario, there may be a time delay between operations 720 and 730. In other words, the application request in operation 730 may be received separately from the state being saved some time later as indicated by the dashed line.

The web server may receive an online application request from the client application at operation 730. The online application request may match a state key and an application identifier association in the user information list which represents the available online application states. At operation 740, the state service may retrieve the available state from the state data store. And, at operation 750, the web server may transmit the state to the client application. The client application may present the online application populated with state information to the user.

The operations included in process 700 are for illustration purposes. Providing a state service according to embodiments may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method executed at least in part by a computing device for providing an online application state service, the method comprising:

identifying a user by employing one of an automated identification scheme through device recognition and a manual identification scheme;

saving a state of an online application utilized by the user through a first client application in conjunction with the user identification, wherein an online application's state determination algorithm is in a sleep cycle and is awoken by an auto save time out algorithm at a regular time interval;

receiving a request for the online application from the user through one of: a subsequent session using the first client application and a new session using a second client application;

implementing a state change determination algorithm to determine altered form data, wherein the state change determination algorithm yields one of a negative determination indicating the sleep cycle and a positive determination to gather and send the form data to the web service;

presenting an option to the user to restore the saved state of the online application when the user returns to a web form;

retrieving the saved state of the online application by accessing the state information of the online application from a state data store;

determining one or more updates to the state information at the first client application;

saving the one or more updates to the state data store in response to receiving the one or more updates to the state information at predetermined intervals from the first client application based on a schedule set by the first client application;

transmitting the state of the online application to one of the first client application and the second client application;

determining a recentness of the state within the state data store; and returning the state service to a listening mode awaiting an action from at least one of: the first client application and the second client application in response to a positive determination of the recentness of the state.

2. The method of claim 1, wherein identifying the user comprises:
employing at least one of a user credential and a password.

3. The method of claim 1, wherein saving the state information triggers generating the state key comprising a pointer to a placeholder in the state data store and a user identifier.

4. The method of claim 3, wherein saving the state information triggers associating the state key with the application identifier and saving the association in a user information list.

5. The method of claim 1, wherein receiving the request for the online application triggers a search of a user information list to find one or more matching state keys.

6. The method of claim 5, wherein finding the one or more matching state keys triggers sending the one on more state keys to the first client application to receive a user selection of a state to restore.

7. The method of claim 1, further comprising:
receiving the subsequent request from the second client application.

8. The method of claim 1, wherein the saved state includes one or more values provided by the user to the online application.

9. The method of claim 8, wherein transmitting the state of the online application triggers populating a user interface of the online application with one or more values saved in the state.

10. A server receiving form data from a web service and providing a state service adapted to manage state information, the server comprising:
a memory;
a processor coupled to the memory, the processor executing at least one application associated with the state service in conjunction with instructions stored in the memory, wherein the state service executes a state determination algorithm to manage the state information such that the state service is configured to:
identify a user by employing one of an automated identification scheme through device recognition and a manual identification scheme;
save a state of an online application utilized by the user through a first client application in conjunction with the user identification, wherein an online application's state determination algorithm is in a sleep cycle and is awoken by an auto save time out algorithm at a regular time interval;
receive a request for the online application from the user through one of: a subsequent session using the first client application and a new session using a second client application;
implementing a state change determination algorithm to determine altered form data, wherein the state change determination algorithm yields one of a negative determination indicating the sleep cycle and a positive determination to gather and send the form data to the web service;
present an option to the user to restore the saved state of the online application when the user returns to a web form;
retrieve the saved state of the online application by accessing the state information of the online application from a state data store;
determine one or more updates to the state information at the first client application;
save the one or more updates to the state data store in response to receiving the one or more updates to the state information at predetermined intervals from the first client application based on a schedule set by the first client application;
transmit the state of the online application to one of the first client application and the second client application;
determine a recentness of the state within the state data store; and
return the state service to a listening mode awaiting an action from at least one of: the first client application and the second client application in response to a positive determination of the recentness of the state.

11. The server of claim 10, wherein the state service is further configured to identify the user through authentication and a persistence of the authentication is determined by a checkbox selection by the user in the first client application.

12. The server of claim 10, wherein the server de-authenticates the user when the user veers away from the first client application.

13. The server of claim 10, wherein the server de-authenticates the user based on a predetermined schedule.

14. The server of claim 10, wherein a user's selection to not restore the state triggers deletion of the state from a user information list and the state data store.

15. The server of claim 10, wherein the server is further configured to poll the first client application to determine one or more changes to the online application.

16. A computer-readable memory device with instructions stored thereon for providing an online application state service, the instructions comprising:
- identifying a user by employing one of an automated identification scheme through device recognition and a manual identification scheme;
- saving a state of an online application utilized by the user through a first client application in conjunction with the user identification, wherein an online application's state determination algorithm is in a sleep cycle and is awoken by an auto save time out algorithm at a regular time interval;
- receiving a request for the online application from the user through one of: a subsequent session using the first client application and a new session using a second client application;
- implementing a state change determination algorithm to determine altered form data, wherein the state change determination algorithm yields one of a negative determination indicating the sleep cycle and a positive determination to gather and send the form data to the web service;
- presenting an option to the user to restore the saved state of the online application when the user returns to a web form;
- retrieving the saved state of the online application by accessing the state information of the online application from a state data store;
- determining one or more updates to the state information at the first client application;
- saving the one or more updates to the state data store in response to receiving the one or more updates to the state information at predetermined intervals from the first client application based on a schedule set by the first client application;
- transmitting the state of the online application to one of the first client application and the second client application;
- determining a recentness of the state within the state data store; and
- returning the state service to a listening mode awaiting an action from at least one of: the first client application and the second client application in response to a positive determination of the recentness of the state.

17. The computer-readable memory device of claim 16, wherein the state information comprises: an extensible markup language (XML) document containing one or more values entered by the user into the online application during a prior interaction when the state is saved.

* * * * *